United States Patent [19]

Hougen

[11] 3,969,036

[45] July 13, 1976

[54] MAGNETIC DRILL

[76] Inventor: Everett D. Hougen, G-5072 Corunna Road, Flint, Mich. 48504

[22] Filed: Jan. 23, 1975

[21] Appl. No.: 543,415

[52] U.S. Cl. .......... 408/76

[51] Int. Cl.[2] .......... B23B 39/14

[58] Field of Search .......... 408/76; 269/8, 17; 335/285

[56] References Cited

UNITED STATES PATENTS

| | | | |
|---|---|---|---|
| 2,289,458 | 7/1942 | Rodgers | 269/17 X |
| 2,818,655 | 1/1958 | DeGaston | 408/76 X |
| 3,049,031 | 8/1962 | Carstens | 408/76 |
| 3,491,995 | 1/1970 | Taraba | 269/8 |
| 3,728,027 | 4/1973 | Watanabe | 408/76 X |

FOREIGN PATENTS OR APPLICATIONS

| | | | |
|---|---|---|---|
| 650,367 | 10/1962 | Canada | 269/17 |

*Primary Examiner*—Othell M. Simpson
*Assistant Examiner*—William R. Briggs
*Attorney, Agent, or Firm*—Barnes, Kisselle, Raisch & Choate

[57] ABSTRACT

A portable magnetic drill unit having a work surface engaging base formed as an electromagnet and a spring biased bearing ball thereon for elevating the rear end of the base slightly above the work surface to enable the unit to be easily moved along the work surface to the desired location for drilling a hole. The strength of the spring is correlated to the weight of the drill unit and the strength of the electromagnet such as to support the unit in a slightly elevated position when the electromagnet is de-energized and to compress when the electromagnet is energized so as to allow the bottom face of the base to contact and magnetically adhere to the support surface.

9 Claims, 11 Drawing Figures

MAGNETIC DRILL

This invention relates to a magnetic drill and, more particularly, to a portable drill unit of the type having an electromagnet base.

Magnetic drill units are used extensively in the metal fabricating field for forming holes in various types of ferrous workpieces where it is either impractical or uneconomical to move the workpiece to a conventional drill press. In the case of a large hole, a large drill unit is normally necessary to produce the required torque. However, a large drill unit requires a relatively large electromagnet. It therefore follows that most electromagnet drill units are relatively heavy and, as a result, it becomes quite difficult to move them on a work surface to a very precise location for drilling an accurately located hole.

The primary object of the present invention is to improve the portability and maneuverability of such drill units by mounting anti-friction work-engaging support means thereon.

More specifically, the present invention contemplates a magnetic drill unit provided with antifriction balls or the like which are spring mounted thereon to support the unit in a position at least slightly elevated from the work surface to facilitate movement of the unit to an accurately located position when the electromagnet is de-energized, the anti-friction support means being rendered inoperative when the electromagnet is energized.

Figure 1:
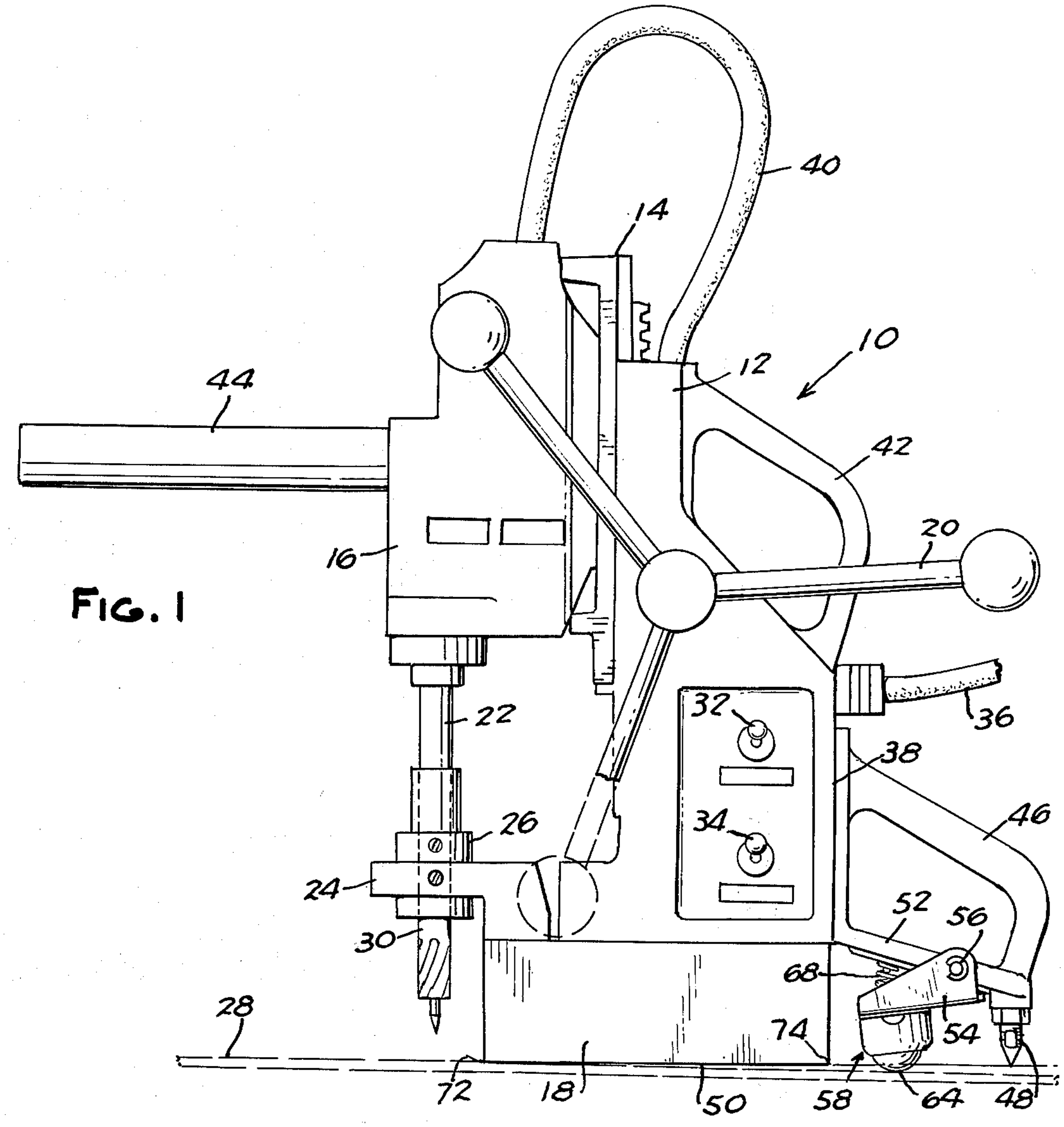
FIG. 1 is a side elevational view of a magnetic drill unit embodying the present invention, showing the orientation thereof when the electromagnet is deenergized.
Figure 2:
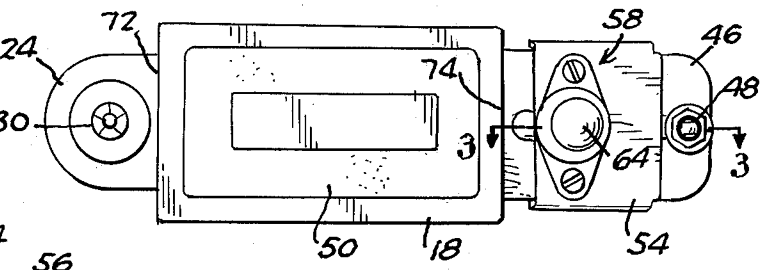
FIG. 2 is a bottom plan view of the drill unit.

The drill unit of the present invention (which is generally designated 10) includes a housing 12 provided with a gear rack 14 on which a conventional electric or air powered drill 16 is mounted. The base of housing 12 comprises an electromagnet 18 of generally rectangular shape. Gear rack 14 is mounted on housing 12 in suitable guides or ways for vertical movement. The drill is moved vertically by rotating a handle 20 which is operatively connected with gear rack 14 by a pinion (not illustrated). Drill 16 is mounted on housing 12 so that the axis of its spindle 22 extends vertically. A forward extension 24 on housing 12 receives a guide bushing 26 through which the arbor on the drill spindle 22 extends. In the embodiment illustrated in the drawings the means for forming a hole in the workpiece 28 is an annular cutter 30. For the purpose of this invention cutter 30 can be a conventional drill attached by a suitable arbor to the drill spindle 22.

On one side of housing 12 there is mounted a pair of switches 32, 34. These switches are connected within the housing to a power line 36 extending from a rear vertical wall 38 of housing 12. Switch 32 can be utilized for energizing and de-energizing electromagnet 18. Switch 34 may be used for energizing and deenergizing the motor of drill 16. Switch 34 is connected to the drill motor by a power line 40 which extends from the upper end of drill 16 and loops downwardly into the upper end of housing 12. It will be appreciated that by extending power line 40 from drill 16 downwardly through the upper end of housing 12 to switch 34, power line 40 in no way interferes with the manipulation of the drill unit when it is manually grasped by the operator by handle 42 at the rear upper end of housing 12 and by the removable extension handle 44 at the front side of drill 16. It will also be appreciated that by mounting drill 16 on housing 12 in the manner illustrated the forward end of the unit or the side face thereof can abut an upstanding flange or wall on the workpiece to permit forming a hole closely adjacent such wall or flange. This results from the fact that housing 12 is no wider than the relatively narrow base 18 and spindle 22 is located at the front side of drill 16 when the latter is mounted on rack 14.

A rearwardly extending support bracket 46 is mounted on rear wall 38 of housing 12. At the rear end of bracket 46 there is mounted a threaded adjusting screw 48 which extends vertically downwardly. Screw 48 is adjusted so that the tip of the cone point at the lower end thereof is flush with the plane of the bottom face 50 of electromagnet 18. Screw 48 stabilizes the unit and resists the tendency for the drill unit to rock upwardly and rearwardly as a result of the upward reaction thrust on the drill unit when a hole is being formed in the ferrous workpiece 28.

Bracket 46 includes a rigid plate 52 on which a U-shaped arm 54 is pivotally mounted as by a horizontally extending pin 56. On the lower face of arm 54 there is mounted an anti-friction ball assembly 58. Assembly 58 includes an outer shell 60 and an inner shell 62. Between these shells there is arranged a large bearing ball 64, the upper half of which is surrounded by numerous small bearing balls 66. With this arrangement it will be appreciated that bearing ball 64 is freely rotatable in outer shell 60. A compression spring 68 is arranged between plate 52 and the top face of arm 54. Spring 68 normally biases arm 54 downwardly in a counterclockwise direction about pin 56 to the position illustrated in FIG. 3. The extent of downward pivotal movement of arm 54 is limited by the interengagement of the rear end of arm 54 with plate 52 as at 70.

Figure 3:
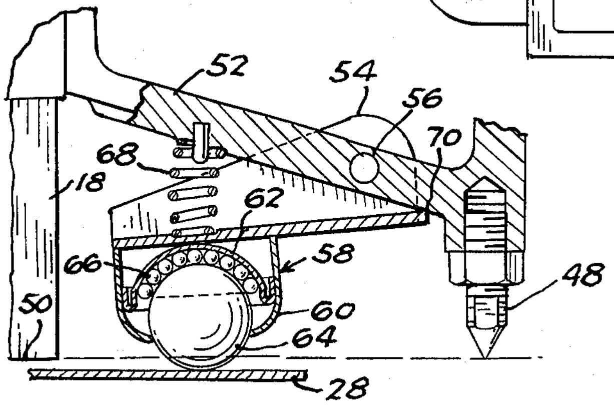
FIG. 3 is a fragmentary sectional view of a portion of the drill unit.

Compression spring 68 is designed to have sufficient strength to elevate the drill unit as shown in FIGS. 1 and 3. More specifically, in the embodiment illustrated in FIGS. 1 through 4 spring 68 is of sufficient strength to pivot arm 54 downwardly to the position shown in FIG. 3 so that the whole drill unit pivots slightly in a counterclockwise direction about the front lower edge 72 of electromagnet 18 as an axis. When so positioned the bottom face 50 of electromagnet 18 is inclined upwardly and rearwardly at a slight angle so that the rear bottom edge 74 of the electromagnet is spaced slightly above (for example, about 1/32 inches) the plane of the top face of workpiece 28. In this condition the entire drill unit is supported solely by the edge 72 of electromagnet 18 and by ball 64. When supported in this manner the drill unit 10 can be readily and easily moved around on the top face of workpiece 28 with little effort. For example, with this arrangement, if the drill unit 10 as a whole weighs about 32 pounds, it can be pushed over the surface of workpiece 28 with as little as about 5 pounds of force applied thereto.

Figure 4:
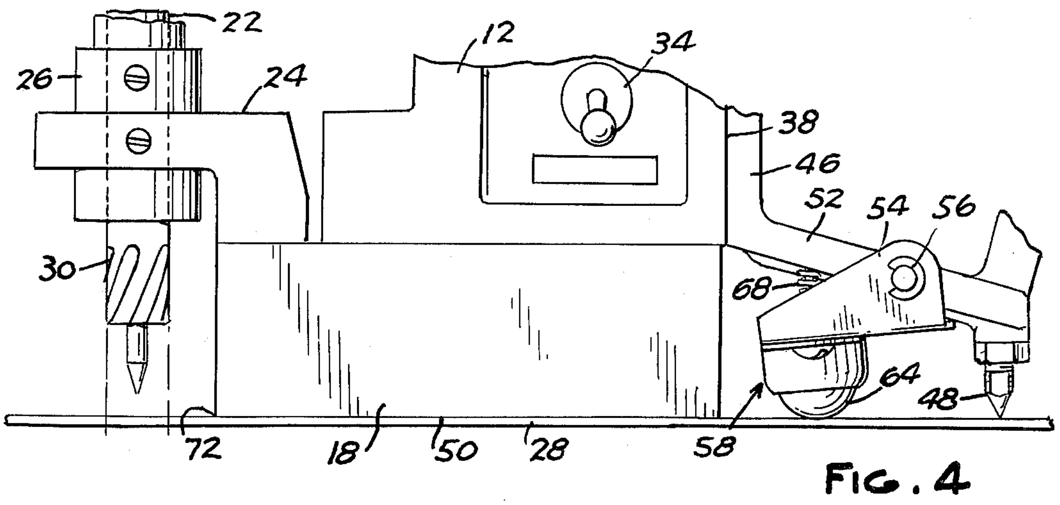
FIG. 4 is a fragmentary view similar to FIG. 1 and showing the orientation of the unit when the electromagnet is energized.

While spring 68 is sufficiently strong to lift the drill unit as shown in FIGS. 1 and 3, at the same time it is sufficiently weak to be compressed when electromagnet 18 is energized to cause the lower face 50 thereof to rock downwardly about its front lower edge 72 into full contact with the top face of workpiece 28. This condition of the unit is illustrated in FIG. 4. It will be realized, of course, that the unit will be moved along the workpiece to a position where the center of cutter 30 is accurately located directly above the center of the hole to be cut before the electromagnet is energized. With the arrangement shown in FIGS. 1 through 4 the unit will be pushed along workpiece 28 in a forwardly direction so that the forward lower edge 72 of electromagnet 18 will scrape the surface of workpiece 28 clean and free of chips. This will assure good magnetic adherence between the lower face 50 of electromagnet 18 and the top face of workpiece 28 when the electromagnet is energized. It will also be observed that the accurate location of the unit will not be disturbed when the electromagnet is energized.

Figure 5:
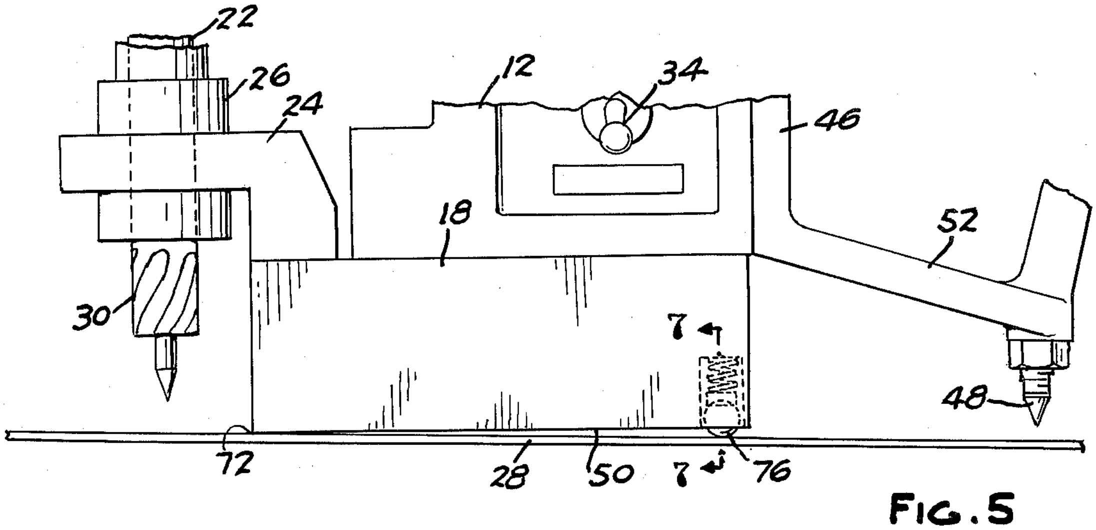
FIG. 5 is a fragmentary side elevational view of a modified form of drill unit according to the present invention.
Figure 6:
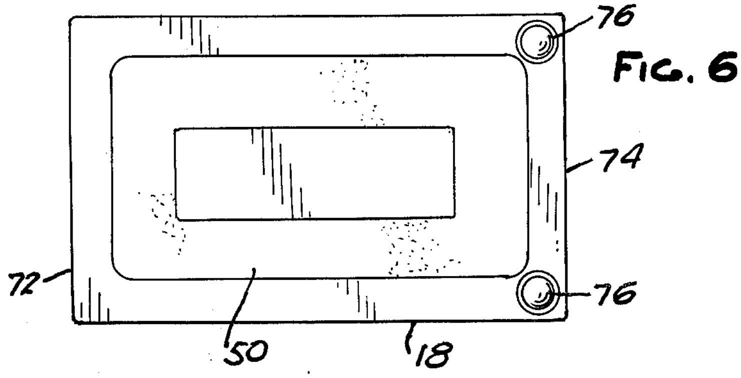
FIG. 6 is a bottom plan view of the base of the drill unit shown in FIG. 5.
Figure 7:
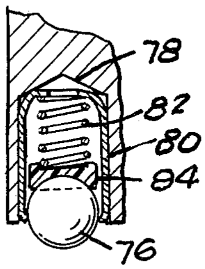
FIG. 7 is a fragmentary sectional view along the line 7—7 in FIG. 5.

The arrangement illustrated in FIGS. 5 through 7 is generally similar to that illustrated in FIGS. 1 through 4. However, in the embodiment shown in FIGS. 5 through 7, instead of employing a single ball assembly 58, there is utilized a pair of bearing balls 76. Balls 76 are retained in sockets 78, located one adjacent each of the rear lower corners of electromagnet 18. Balls 76 are arranged within tubular retainers 80. Each ball 76 is urged downwardly in its retainer by a compression spring 82 acting through an anti-friction bearing 84 engaging the top side of the ball.

The operation of the device illustrated in FIGS. 5 through 7 is the same as that previously described. The balls 76 support the unit in a slightly tilted position as shown in FIG. 5 when the electromagnet is de-energized. Springs 82 are designed to compress when the electromagnet is energized to cause firm magnetic adherence of the unit to the workpiece while maintaining the precise position to which it was adjusted.

Figure 8:
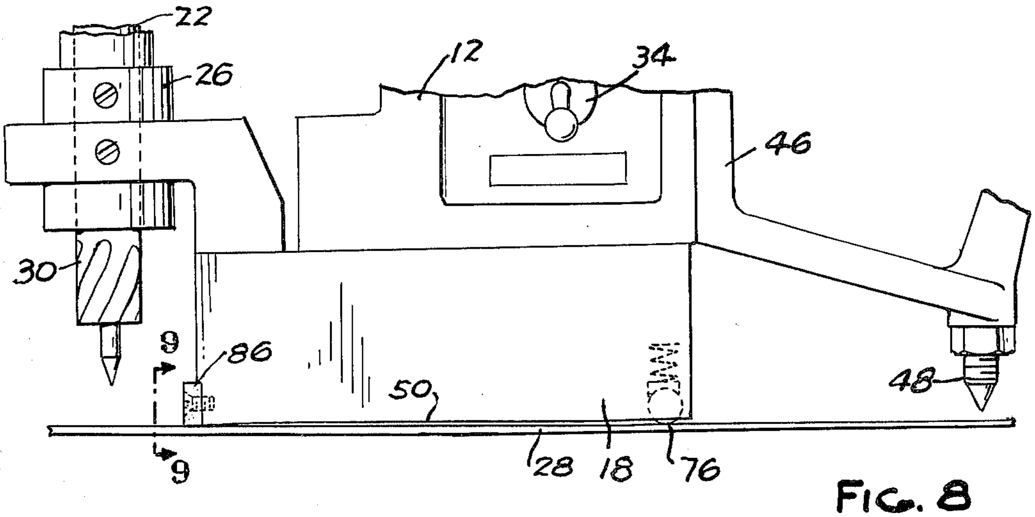
FIG. 8 is a view similar to FIG. 4 and showing a further modified form of drill unit according to the present invention.
Figure 9:
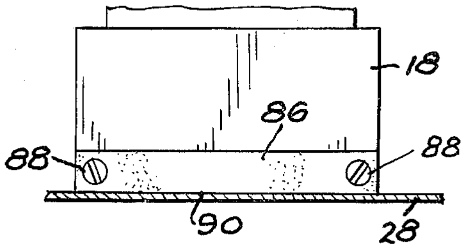
FIG. 9 is a fragmentary sectional view taken along the line 9—9 in FIG. 8.

The embodiment illustrated in FIGS. 8 and 9 is the same as that shown in FIGS. 5 through 7 except that an anti-friction bar 86 (a nylon bar, for example) is mounted, as by screws 88, to the front end of electromagnet 18. Bar 86 is preferably of rectangular cross section and its lower face 90 is flush with the lower face of electromagnet 18. Bar 86 is formed of an antifriction material which is resistant to wear. Thus, bar 86 accomplishes two results; namely: it prevents wear of the front edge of the electromagnet and, at the same time, further reduces the force required to move the unit along workpiece 28. If the scrapping action is considered unnecessary, bar 86 can be replaced by one or more rollers or balls fixedly mounted at the front end of base 18, the rollers or balls being operative only when the unit is in the tilted position.

Figure 10:
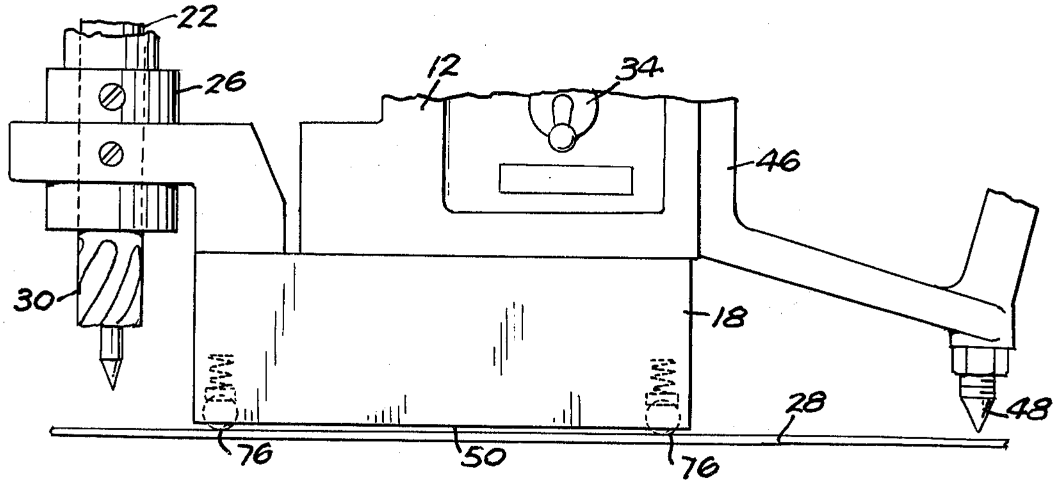
FIG. 10 is a view similar to FIG. 8 and showing a further embodiment of the present invention.
Figure 11:
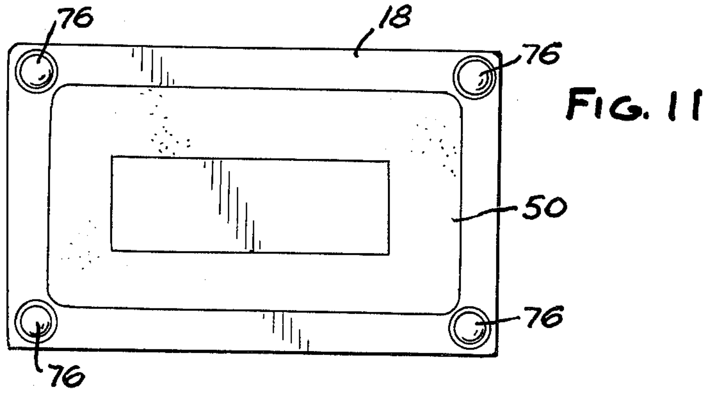
FIG. 11 is a bottom plan view of the base of the drill unit shown in FIG. 10.

The embodiment illustrated in FIGS. 10 and 11 is likewise similar to that illustrated in FIGS. 5 through 7. In the unit illustrated in FIGS. 10 and 11 four bearing balls 76 are mounted at the four corners of electromagnet 18 in the same manner as is illustrated in FIG. 7. In this arrangement the spring pressed balls 76 are adapted to support the entire unit in a position spaced slightly above the top face of workpiece 28. However, when the electromagnet is energized all four springs are compressed so that the bottom face 50 of the electromagnet contacts and magnetically adheres to the top face of workpieces 28 without disturbing the precisely located position to which the unit was moved.

It will be understood that in each of the embodiments illustrated the springs are designed such that they are only of sufficient strength to elevate the unit slightly. This minimizes the force of the electromagnet required for compressing the springs. Thus, substantially all of the force of the electromagnet is utilized for firmly retaining the unit in position on the workpiece.

I claim:

1. In a portable magnet base drill unit of the type including a support on which a motor-driven drill is mounted, said support having an electromagnet base of generally rectangular shape, said base having a generally flat bottom face perpendicular to the axis of the drill spindle, said electromagnet when energized being adapted to magnetically adhere to an underlying flat magnetic support surface to support the drill unit thereon in a fixed location with the drill spindle projecting vertically downwardly along an axis located forwardly of the front end of the magnet base, the front edge of the bottom face of the magnet base extending transversely of the base in a generally straight line, that improvement which comprises anti-friction means mounted on said support adjacent the rear end of said magnet base and resiliently biased to project downwardly at least slightly beyond the plane of said bottom face, said anti-friction means cooperating with the front edge of the base to slidably support the drill unit on said support surface when the magnet is in a de-energized condition with the bottom face of the magnet inclined upwardly and rearwardly at a slight angle from said front edge whereby when the drill unit is moved forwardly on said support surface to locate the drill spindle vertically above the location of the hole to be drilled therein, said front edge of the magnet base scrapes debris and chips from the underlying support surface traversed by said front edge, the electromagnet being of sufficient strength to overcome the bias on said anti-friction means so that when the magnet is energized the bottom face thereof is magnetically attracted into firm coplanar engagement with the scraped underlying portion of the support surface and the drill unit is supported on the support surface in a firm stable position, the drill spindle axis extending perpendicular to the plane of the support surface.

2. The improvement called for in claim 1 wherein said anti-friction means comprise rolling means.

3. The improvement called for in claim 1 wherein said anti-friction means comprise at least once rolling element.

4. The improvement called for in claim 1 wherein said anti-friction means comprise at least one freely rolling ball member.

5. The improvement called for in claim 1 wherein said anti-friction means are spring biased.

6. The improvement called for in claim 1 wherein said anti-friction means are biased by compression spring means.

7. The improvement called for in claim 1 wherein said anti-friction means are spaced rearwardly beyond the rear end of said base.

8. The improvement called for in claim 1 wherein said support is provided with a laterally extending support arm projecting rearwardly beyond the rear end of said electromagnet and spaced above the lower face thereof, a lever mounted on said arm for pivotal movement about a generally horizontal axis, a compression spring acting between said support arm and said lever and biasing said arm in a downwardly direction, said anti-friction means comprising a freely rolling ball element mounted on said lever and projecting downwardly therefrom.

9. The improvement called for in claim 8 wherein, said ball member is disposed rearwardly of the rear end of said electromagnet such that when the electromagnet is de-energized the drill unit contacts the support face substantially only at the front edge of the base and at said ball member.

* * * * *